United States Patent
Diamanti et al.

(10) Patent No.: US 12,014,142 B2
(45) Date of Patent: Jun. 18, 2024

(54) MACHINE LEARNING FOR TRAINING NLP AGENT

(71) Applicant: INTERNATIONAL BUSINESS MACHINES CORPORATION, Armonk, NY (US)

(72) Inventors: Gary Francis Diamanti, Wake Forest, NC (US); Shikhar Kwatra, San Jose, CA (US); Ryan Anderson, Kensington, CA (US); Rodrigo Goulart Silva, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 457 days.

(21) Appl. No.: 17/354,825

(22) Filed: Jun. 22, 2021

(65) Prior Publication Data
US 2022/0405473 A1    Dec. 22, 2022

(51) Int. Cl.
| | |
|---|---|
| *G06F 40/232* | (2020.01) |
| *G06F 18/22* | (2023.01) |
| *G06F 40/284* | (2020.01) |
| *G06N 3/08* | (2023.01) |
| *G06N 20/00* | (2019.01) |

(52) U.S. Cl.
CPC ............ *G06F 40/284* (2020.01); *G06F 18/22* (2023.01); *G06N 3/08* (2013.01); *G06N 20/00* (2019.01)

(58) Field of Classification Search
None
See application file for complete search history.

(56) References Cited

U.S. PATENT DOCUMENTS

| | | |
|---|---|---|
| 5,842,196 A | 11/1998 | Agarwal et al. |
| 6,549,919 B2 | 4/2003 | Lambert et al. |
| 6,694,325 B2 | 2/2004 | Jas |
| 7,043,486 B2 | 5/2006 | Cope |

(Continued)

OTHER PUBLICATIONS

Laleau, R. et al., "A generic process to refine a B specification into a relational database implementation," In International Conference of B and Z Users, Aug. 29, 2000, pp. 22-41, Springer, Berlin, Heidelberg.

(Continued)

*Primary Examiner* — Seong-Ah A Shin
(74) *Attorney, Agent, or Firm* — CUENOT, FORSYTHE & KIM, LLC (57) ABSTRACT

A computer-implemented process for training a natural language processing (NLP) agent having a reinforced learning model includes the following operations. A type of document from a document corpus is identified using metadata particularly associated with the document. The NLP agent tokenizes the document to generate a plurality of tokens. Using a schema identified from the type of the document, one of the plurality of tokens is compared to a system of record (SOR) field from the schema. A similarity score between the one of the plurality of tokens with a correct value and a reward based upon the similarity score are generated. A determination is made that an optimum minimum average similarity rate has not been obtained. Based upon the determination, the reinforced learning model is trained using a loss function that includes the reward.

20 Claims, 7 Drawing Sheets

(56) References Cited

U.S. PATENT DOCUMENTS

| | | | |
|---|---|---|---|
| 7,107,284 B1* | 9/2006 | Betz | G06F 16/283 |
| 7,287,044 B2 | 10/2007 | Wilmot | |
| 7,925,670 B2 | 4/2011 | Houston et al. | |
| 7,930,322 B2 | 4/2011 | Maclennan | |
| 8,671,084 B2 | 3/2014 | Chowdhary et al. | |
| 8,726,343 B1 | 5/2014 | Borzycki et al. | |
| 9,443,224 B2 | 9/2016 | Dunn et al. | |
| 11,475,254 B1* | 10/2022 | Carvalho | G06Q 30/0201 |
| 2017/0220578 A1* | 8/2017 | Kazi | G06Q 50/01 |
| 2019/0103095 A1* | 4/2019 | Singaraju | G06F 16/35 |
| 2019/0377825 A1* | 12/2019 | Chang | G06F 16/328 |
| 2019/0384832 A1* | 12/2019 | Estes | G06Q 10/063112 |
| 2020/0027560 A1* | 1/2020 | Ling | G16H 10/60 |
| 2021/0049326 A1* | 2/2021 | Amend | G06F 40/232 |
| 2021/0303636 A1* | 9/2021 | Dua | G06F 16/9038 |

OTHER PUBLICATIONS

"Watson Discovery—Overview," [online] IBM Corp., [retrieved Jun. 18, 2021], retrieved from the Internet: <https://www.ibm.com/cloud/watson-discovery>, 13 pg.

"Smart Document Understanding," [online] IBM Cloud Docs, Discovery, IBM Corp., Apr. 14, 2021, retrieved from the Internet: <https://cloud.ibm.com/docs/discovery?topic=discovery-sdu>, 9 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

MACHINE LEARNING FOR TRAINING NLP AGENT

BACKGROUND

The present invention relates to electronic document processing, and more specifically, to using a combination of reinforced learning and artificial intelligence to train a natural language processing (NLP) agent used to process electronic documents.

Natural language processing is a field of computer science and linguistics concerned with the interactions between computers and human (natural) languages. NLP as a field of computer science began as a branch of artificial intelligence. Modern NLP algorithms are grounded in machine learning (ML) and include both statistical methods and neural networks. As used herein, a "NLP agent" is a special-purpose computer system including both hardware and software utilizing NLP algorithms that are configured to process electronic documents by performing natural language processing and analysis of natural language data extracted from the electronic documents.

One proposed use of NLP has been to extract document data from commercial documents (e.g., invoices, purchase orders, etc.) that can be matched against a schema such as a Systems of Record (SOR). A SOR is a data management term for an information storage system (e.g., a database implemented on a computer system) that is the authoritative data source for a given data element or piece of information. For example, a billing invoice may include a billing address, which includes data for street number, street name, city/town, state, country, zip code, etc. Once extracted from the document and matched to particular fields in the SOR, this extracted document data can be accurately recorded in the information storage system.

There are, however, difficulties in training a NLP agent to extract document data from documents and accurately match the extracted text to fields in the SOR. One approach is to use a form of supervised machine learning (SL) to tie the document data to each field in the SOR. However, this approaches involves human intervention in the form of manual annotation of the document to identify where, within the document, each SOR field is located. This problem is greatly exacerbated by the need for the NLP agent to be able to handle a large number of different documents—each of which can be formatted differently such that different SOR fields can be located in different locations within the document. Another problem with this approach is that information gained during manual validation (e.g., identifying relationships between different document data) is not being recorded and, therefore, cannot be subsequently used during the SL process.

SUMMARY

A computer-implemented process for training a NLP agent having a reinforced learning model includes the following operations. A type of document from a document corpus is identified using metadata particularly associated with the document. The NLP agent tokenizes the document to generate a plurality of tokens. Using a schema identified from the type of the document, one of the plurality of tokens is compared to a SOR field from the schema. A similarity score between the one of the plurality of tokens with a correct value and a reward based upon the similarity score are generated. A determination is made that an optimum minimum average similarity rate has not been obtained. Based upon the determination, the reinforced learning model is trained using a loss function that includes the reward.

A computer hardware system for training a NLP agent having a reinforced learning model includes the following operations includes a hardware processor configured to perform the following executable operations. A type of document from a document corpus is identified using metadata particularly associated with the document. The NLP agent tokenizes the document to generate a plurality of tokens. Using a schema identified from the type of the document, one of the plurality of tokens is compared to a SOR field from the schema. A similarity score between the one of the plurality of tokens with a correct value and a reward based upon the similarity score are generated. A determination is made that an optimum minimum average similarity rate has not been obtained. Based upon the determination, the reinforced learning model is trained using a loss function that includes the reward.

A computer program product includes a computer readable storage medium having stored therein program code for training a NLP agent having a reinforced learning model includes the following operations. The program code, which when executed by a computer hardware system, cause the computer hardware system to perform the following. A type of document from a document corpus is identified using metadata particularly associated with the document. The NLP agent tokenizes the document to generate a plurality of tokens. Using a schema identified from the type of the document, one of the plurality of tokens is compared to a SOR field from the schema. A similarity score between the one of the plurality of tokens with a correct value and a reward based upon the similarity score are generated. A determination is made that an optimum minimum average similarity rate has not been obtained. Based upon the determination, the reinforced learning model is trained using a loss function that includes the reward.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1A:
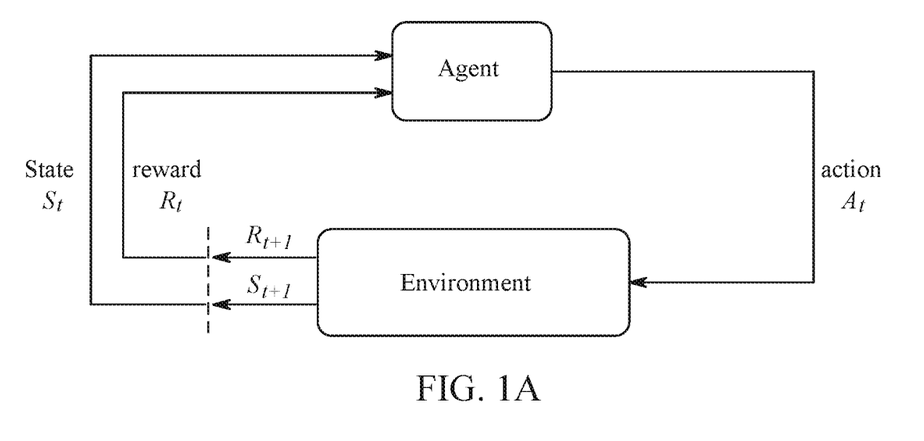
FIGS. 1A and 1B are block diagram respectively schematically illustrating a reinforced learning (RL) approach and a deep Q-learning approach (DQN).

To address the problem of training NLP agents, a modified reinforced learning approach is employed. Notably, while other approaches for extracting document data from documents oftentimes involve human intervention, the present approach uses a modified reinforced learning approach with limited and, preferably, without human intervention. Machine learning paradigms include supervised learning (SL), unsupervised learning (UL), and reinforced learning (RL). RL differs from SL by not requiring labeled input/output pairs and not requiring sub-optimal actions to be explicitly corrected. Reference is made to FIG. 1A which schematically describes a generic RL approach. In describing RL, the following terms are oftentimes used. The "environment" refers to the world in which the agent operations. The "State" ($S_t$) refers to a current situation of the agent. Each State may have one or more dimensions that describe the State. The "reward" ($R_t$) is feedback from the environment (also illustrated as "r" in FIG. 1B). The "policy" is a methodology by which to map the State of the agent to certain actions ($A_t$). The "value" is a future reward received by an agent by taking an action in a particular State.

Figure 1B:
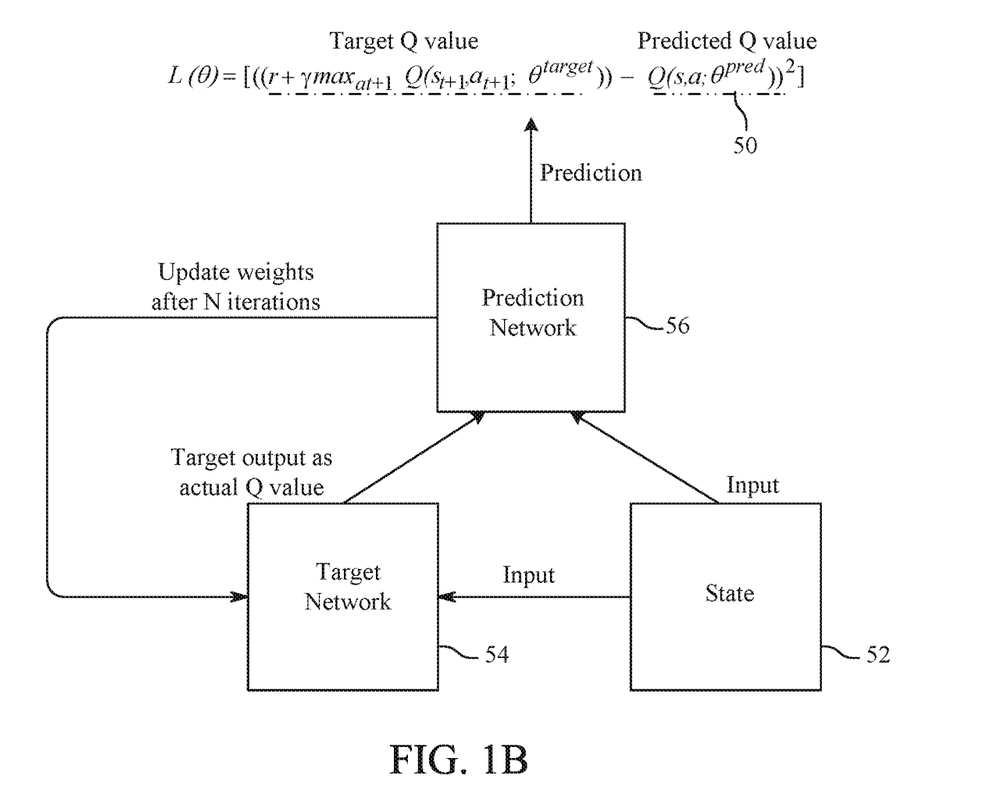

Examples of RL algorithms that may be used include Markov decision process (MDP), Monte Carlo methods, temporal difference learning, Q-learning, Deep Q Networks (DQN), State-Action-Reward-State-Action (SARSA), a distributed cluster-based multi-agent bidding solution (DC-MAB), and the like. Reference is made to FIG. 1B, which illustrates one example of the operation of a DQN model. DQN is a combination of deep learning (i.e., neural network based) and reinforced learning. Deep learning is another subfield of machine learning that involves artificial neural networks. An example of a computer system that employs deep learning is IBM's Watson. The DQN model is used to absorb and store knowledge about metadata of a document and best decisions for each type of document.

A neural network can be seen as a universal functional approximator that can be used to replace the Q-table used in Q-learning. In a DQN model, the loss function 50 is represented as a squared error of the target Q value and prediction Q value. Error is minimized by optimizing the weights, $\theta$. In DQN, two separate networks (i.e., target network 54 and prediction network 56 having the same architecture) can be respectively employed to estimate target and prediction Q values based upon state 52. The result from the target model is treated as a ground truth for the prediction network 56. The weights for the prediction network 56 get updated every iteration and the weights of the target network 54 get updated with the prediction network 56 after N iterations.

Figure 2:
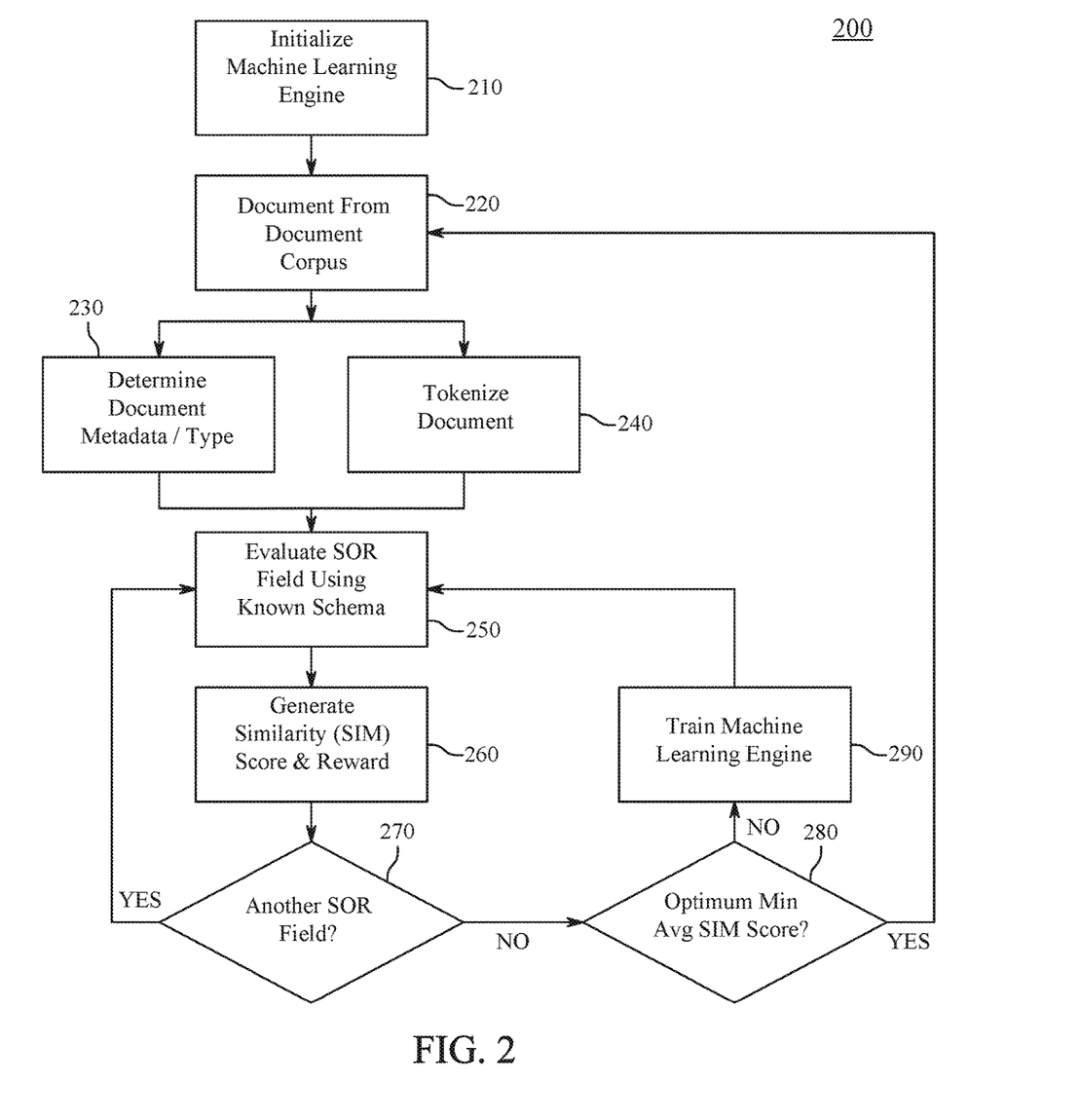
FIG. 2 is a block diagram illustrating an example method using the architecture of FIG.
Figure 3:
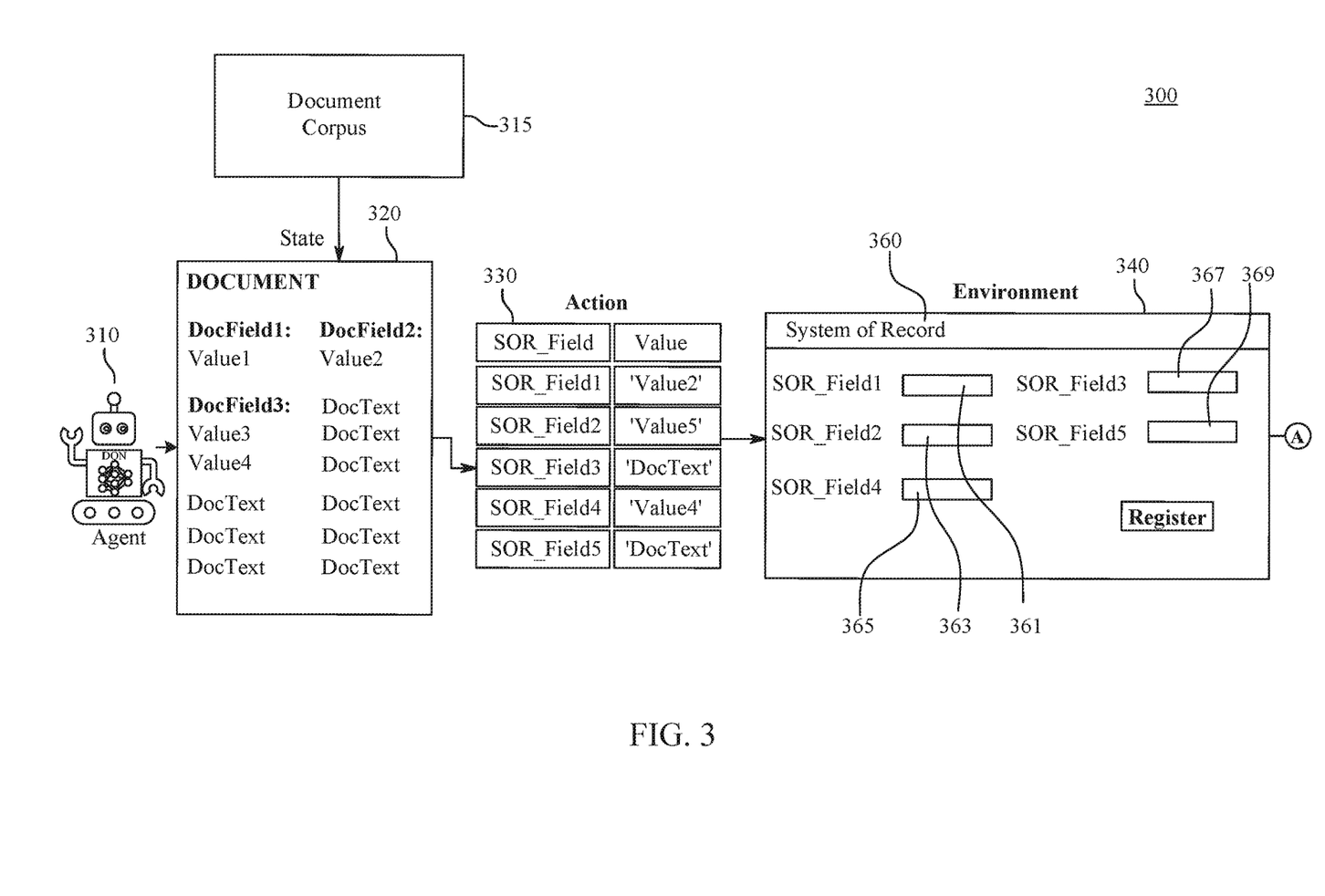
FIG. 3 is a block diagram illustrating a modified reinforced learning approach according to an aspect of the present invention.

Reference is made to FIG. 2 and FIG. 3, which respectively illustrate a methodology 200 and an architecture 300 for training a NLP agent 310. The NLP agent 310 is capable any number of following functions. One function is optical character recognition (OCR), which involves receiving an image that represents printed text (e.g., a document) and identifying, from the image, the corresponding text. Another function is word segmentation (also known as tokenization), in which a sequence of characters are converted into a sequence of tokens (or words). A further function include morphological analysis, which includes analyzing the structure of words (and parts thereof) to identify base and contextual meanings of words. Other functions involve generating a formal grammar that describes the language's syntax, determining meaning of individual words in context, identifying relationships between words, among other known functions.

In 210 the operation begins with the initialization of the machine learning engine for the NLP agent 310. The machine learning engine employs a modified RL approach as generally illustrated in FIG. 1A and more specifically illustrated in FIG. 1B. As will be further discussed below, the modified RL approaches uses a State $S_t$, Action $A_t$, Agent, and Environment.

For each particular document being analyzed, the State $S_t$ (320) includes metadata of that particular document (i.e., State Dimension 1) and text selected by the DQN model that is within the SOR fields 361, 363, 365, 367, 369 (i.e., State Dimension 2). The Action $A_t$ will involve randomly matching text tokens (from the document 350) with SOR fields 361, 363, 365, 367, 369 (from the SOR 360). The NLP agent 310 acts as the Agent. For the Environment, the SOR fields 361, 363, 365, 367, 369 or the whole SOL 360 are used.

In 220, a document is retrieved from a heterogeneous document corpus 315. The documents in the document corpus 315 can be both document images as well as editable/non-image documents (e.g., a PDF file). Additionally, the document corpus can include documents of varying differing types. The documents in the document corpus can include both structured and unstructured documents. Operations 230-290 can be performed for each document 350 in the document corpus 315.

In 230, the NLP agent 310 obtains metadata about the document 350 that can then be used to define a type of the document. Examples of metadata about the document 350 include original file format/type, file name, document size in bytes, number of pages, number of paragraphs, number of words, number of characters, text encoding, author, language among others. The metadata can serve as one dimension (i.e., State Dimension 1) for the State as part of the modified RL approach.

In 240, the NLP agent 310 extracts the raw data from the document 350, and the NLP agent 310 is not limited as to a particular methodology by which to extract the raw document. For example, if the document includes an image, optical character recognition (OCR) can be performed on the document 350 to obtain the raw data. In addition to or alternatively, the document 350 can include natively-accessible data. Once the raw data has been extracted from the document 350, the raw data can be tokenized into document data (e.g., text tokens) using known tokenizing techniques. With regard to the modified RL approach, the extracted text serves as both an Action $A_t$ 330 and a portion of the State $S_t$ 320.

In 250, a schema (e.g., a system of record 360) is identified based upon the type of document previously identified in 230. The text tokens from the document 350 are shuffled so as to be randomly matched with a SOR field 361, 363, 365, 367, 369 of the SOR 360. Initially, a single SOR field can be selected to receive the randomly matched text token. While it is possible to match multiple text tokens with multiple SOR fields, this analysis becomes exponentially more difficult with each additional SOR field being evaluated. However, once the DQN model has been trained for one SOR field, a second/subsequent SOR field can be trained using the randomly matched text token. Each SOR field 361, 363, 365, 367, 369 will respectively be associated with a "Correct Value" that defines a permissible value contained with a particular SOR field 361. By way of example, if the SOR field 361 corresponded to a State, the correct values may be the full name of the State (e.g., California, New York, etc.) and/or may be abbreviations of the State (e.g., CA, NY, etc.).

Additionally, based upon prior training, the DQN model can predict location significance in the document 350. For example, based upon a determination that one particular text token having a particular location in the document 350 is associated with a first particular SOR field, the DQN model can predict that another text token located near that particular location in the document 350 may be associated with a different SOR field that has an association (e.g., dimensional) with the first particular SOR field. Accordingly, the tokenizing of the document 350 can not only generate the text tokens but as well as locations for each individual text token.

In 260, the NLP agent 310 (acting as the Environment of the modified RL approach) compares the input (i.e., the text token matched to the particular SOR field 361) with the Correct Value to generate a current similarity score. The NLP agent 310 is not limited in the way the similarity score is generated. However, in certain aspects a determination of Levenshtein distance can be employed. Other known similarity metrics capable of being used to train the NLP agent 310 include, for example, the Damerau-Levenshtein distance, the Hamming distance, and the Jaro distance.

A Levenshtein distance is a known string metric for measuring the difference between two sequences. In the context of comparing two words, the Levenshtein distance is a minimum number of single-character edits (i.e., insertion, deletion, or substitution) needed to transform one word into the other word. Referring to the equation illustrated below, the Levenshtein distance between two strings (a, b) is a function $lev_{a,b}(i,j)$ who value is a distance between an i-symbol prefix (initial substring) of string a and a j-symbol prefix of string b. For example, the terms "name" and "framed" have a Levenshtein distance of 3. The three edits are: (i) the letter "f" is inserted prior to the letter "n", (ii) the letter "r" is substituted for the letter "n", and (iii) the letter "d" is inserted after the letter "e."

$$lev_{a,b}(i, j) = \begin{cases} \max(i, j) & \text{if } \min(i, j) = 0, \\ \min \begin{cases} lev_{a,b}(i-1, j) + 1 \\ lev_{a,b}(i, j-1) + 1 \\ lev_{a,b}(i-1, j-1) + 1_{a_i \neq b_j} \end{cases} & \text{otherwise.} \end{cases}$$

The current similarity score is compared against a score from previous Action $A_t$. If the current Action $A_t$ (i.e., the shuffling of the text tokens) makes the similarity score go up, the Action $A_t$ receives a positive reward. Alternatively, if the Action $A_t$ makes the score go down, the Action receives a negative reward. No change in the score results in no reward. The reward, for example, can be an arbitrary number (e.g., a positive reward=1 and the score goes up; no reward=0 and there is no change in the score; and a negative reward/punishment=−1 and the score goes down) or a function of the similarity score (e.g., reward=new_score−original_score). The reward score (r) is part of loss function illustrated in FIG. 1B.

In 270, the operations of 250 and 260 are performed for each SOR field 361, 363, 365, 367, 369 in the SOR 360. Once all of the SOR fields 361, 363, 365, 367, 369 in the SOR 360 have had a similarity score associated therewith, the operation proceeds to 280.

In 280, the NLP agent 310 repeats operations 250-270 for the document 350 until the NLP agent 310 determines than an optimized minimum average similarity rate among all SOR fields 361, 363, 365, 367, 369 in the SOR 360 has been obtained. Although not limited in this manner, an arbitrary quality metric value can be stipulated at the beginning of the training, for example, 85% of similarity score. The DQN model can aim to keep training until a plateau is reached that is above that number, for example, when the similarity score does not get better after predetermined number of iterations getting 90% score. If the optimized minimum average similarity rate among all fields 361, 363, 365, 367, 369 in the SOR 350 has been obtained, then process 200 can proceed to identifying another document 350 in the document corpus 315 and analyze that document employing operations 230-290.

These operations can be continued until the document corpus 315 has been completely processed. Alternatively, for example, if after random multiple documents the DQN model learned how to perfectly get an 100% similarity score, then an assumption can be made that the DQN model is very well trained. Otherwise, the system would continue the process of training the DQN model until the end of the corpus until optimized. This could also involve the system looping through the same document corpus more than once.

In 290, if the optimized minimum average similarity rate among all SOR fields 361, 363, 365, 367, 369 in the SOR 360 has not been obtained, the DQN model of the NLP agent 310 is trained using State Dimension 1 and State Dimension 2.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 4:
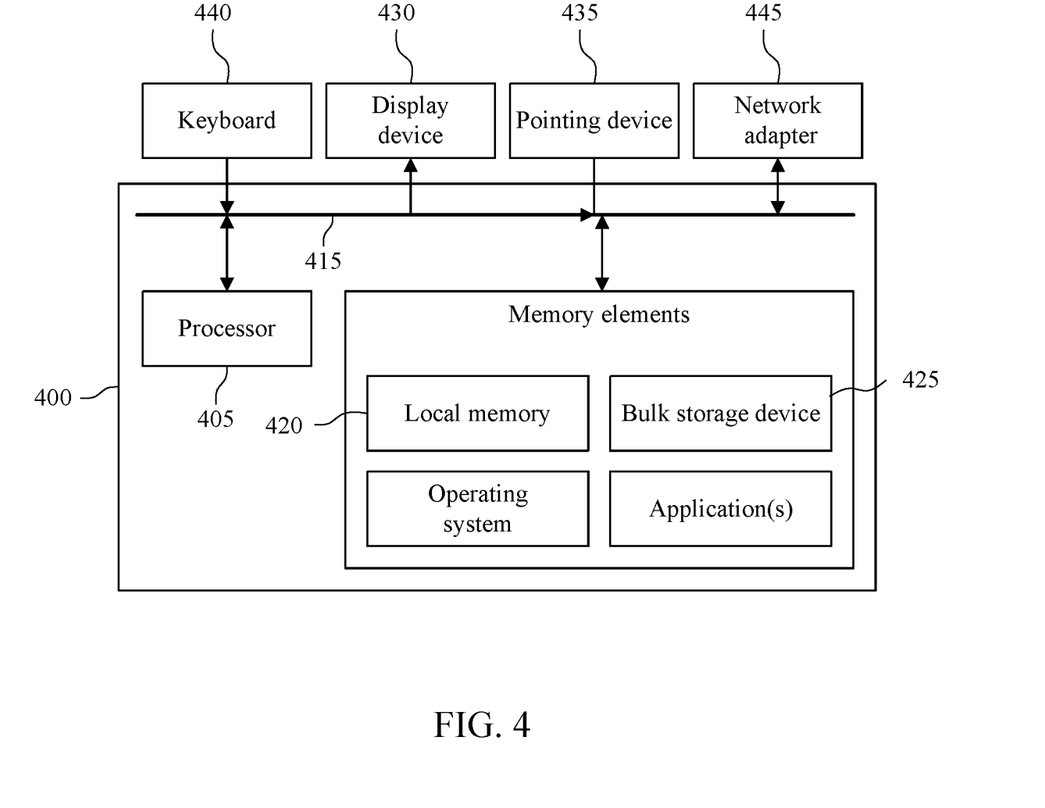
FIG. 4 is a block diagram illustrating an example of computer hardware system for implementing the NLP agent optimizing architecture of FIG. 3.

FIG. 4 is a block diagram illustrating example architecture for a data processing service 400 for executing the NLP agent optimizing architecture. The data processing system 400 can include at least one processor 405 (e.g., a central processing unit) coupled to memory elements 410 through a system bus 415 or other suitable circuitry. As such, the data processing system 400 can store program code within the memory elements 410. The processor 405 can execute the program code accessed from the memory elements 410 via the system bus 415. It should be appreciated that the data processing system 400 can be implemented in the form of any system including a processor and memory that is capable of performing the functions and/or operations described within this specification. For example, the data processing system 400 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The data processing system 400 also can include one or more cache memories (not shown) that provide temporary storage of at least some program code in order to reduce the number of times program code must be retrieved from the local memory 420 and/or bulk storage device 425 during execution.

Input/output (I/O) devices such as a display 430, a pointing device 435 and, optionally, a keyboard 440 can be coupled to the data processing system 400. The I/O devices can be coupled to the data processing system 400 either directly or through intervening I/O controllers. For example, the display 430 can be coupled to the data processing system 400 via a graphics processing unit (GPU), which may be a component of the processor 405 or a discrete device. One or more network adapters 445 also can be coupled to data processing system 400 to enable the data processing system 400 to become coupled to other systems, computer systems, remote printers, and/or remote storage devices through intervening private or public networks. Modems, cable modems, transceivers, and Ethernet cards are examples of different types of network adapters 445 that can be used with the data processing system 400.

As pictured in FIG. 4, the memory elements 410 can store the components of the NLP agent architecture of FIG. 3. Being implemented in the form of executable program code, these components of the data processing system 400 can be executed by the data processing system 300 and, as such, can be considered part of the data processing system 400.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
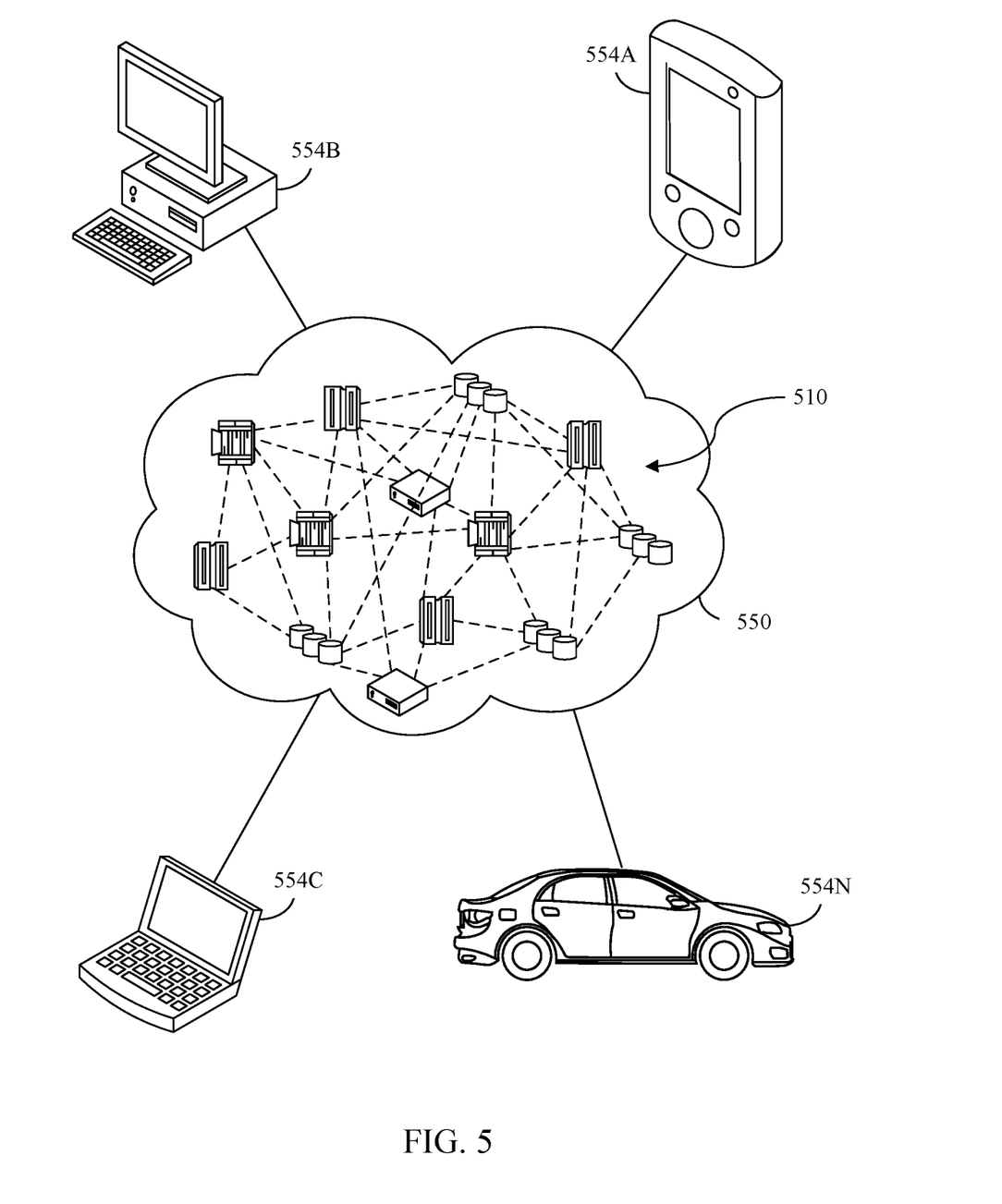
FIG. 5 depicts a cloud computing environment according to an embodiment of the present invention.

Referring now to FIG. 5, illustrative cloud computing environment 550 to be used with the NLP agent training architecture is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
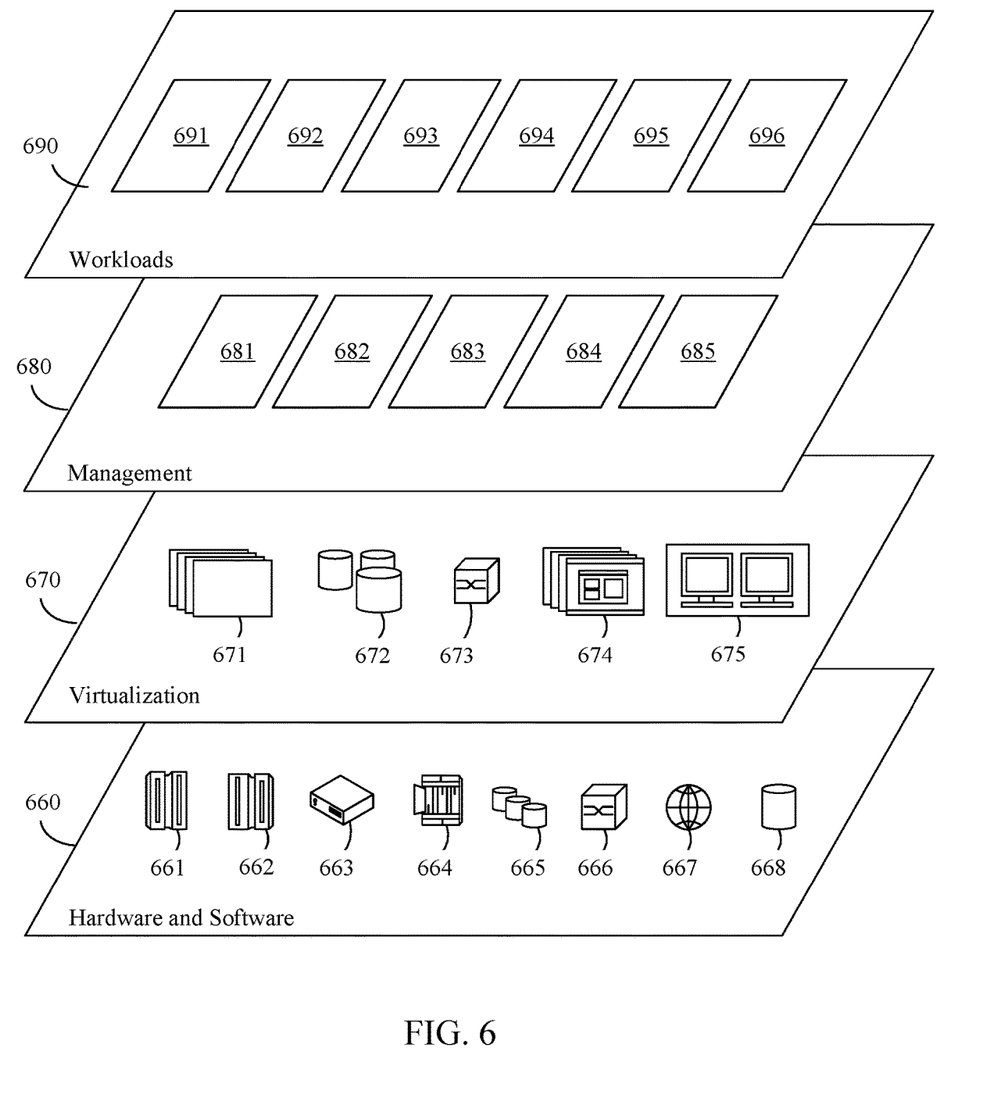
FIG. 6 depicts abstraction model layers according to an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and operations of the NLP agent training architecture 696.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method for training a natural language processing (NLP) agent having a reinforced learning model, comprising:
   identifying, using metadata particularly associated with a document from a document corpus, a type of the document;
   tokenizing, by the NLP agent, the document to generate a plurality of tokens;
   comparing one of the plurality of tokens to a system of record (SOR) field from a schema identified from the type of the document;
   generating a similarity score between the one of the plurality of tokens with a correct value and a reward based upon the similarity score;
   determining that an optimum minimum average similarity rate has not been obtained; and
   training, based upon the determining, the reinforced learning model using a loss function that includes the reward.

2. The method of claim 1, wherein
   the comparing and the generating are performed for all of a plurality of SOR fields in the schema.

3. The method of claim 2, wherein
   the determining is based upon similarity scores for all of the plurality of SOR fields.

4. The method of claim 1, wherein
   the reinforced learning model is a Deep Q Network.

5. The method of claim 1, wherein
   the similarity score use a Levenshtein distance.

6. The method of claim 1, wherein
   after a determination is made that optimum minimum average similarity rate has been obtained, the training is repeated using another document from the document corpus.

7. The method of claim 1, wherein
   the tokenizing includes identifying a respective location for each of the plurality of tokens.

8. The method of claim 1, wherein
   the NLP agent includes a machine learning engine.

9. A computer hardware system for training a natural language processing (NLP) agent having a reinforced learning model, comprising:
   a hardware processor configured to perform the following executable operations:
   identifying, using metadata particularly associated with a document from a document corpus, a type of the document;
   tokenizing, by the NLP agent, the document to generate a plurality of tokens;
   comparing one of the plurality of tokens to a system of record (SOR) field from a schema identified from the type of the document;
   generating a similarity score between the one of the plurality of tokens with a correct value and a reward based upon the similarity score;
   determining that an optimum minimum average similarity rate has not been obtained; and
   training, based upon the determining, the reinforced learning model using a loss function that includes the reward.

10. The system of claim 9, wherein
the comparing and the generating are performed for all of a plurality of SOR fields in the schema.

11. The system of claim 10, wherein
the determining is based upon similarity scores for all of the plurality of SOR fields.

12. The system of claim 9, wherein
the reinforced learning model is a Deep Q Network.

13. The system of claim 9, wherein
the similarity score use a Levenshtein distance.

14. The system of claim 9, wherein
after a determination is made that optimum minimum average similarity rate has been obtained, the training is repeated using another document from the document corpus.

15. The system of claim 9, wherein
the tokenizing includes identifying a respective location for each of the plurality of tokens.

16. The system of claim 9, wherein
the NLP agent includes a machine learning engine.

17. A computer program product, comprising:
a computer readable storage medium having stored therein program code for training a natural language processing (NLP) agent having a reinforced learning model,
the program code, which when executed by a computer hardware system, cause the computer hardware system to perform:
   identifying, using metadata particularly associated with a document from a document corpus, a type of the document;
   tokenizing, by the NLP agent, the document to generate a plurality of tokens;
   comparing one of the plurality of tokens to a system of record (SOR) field from a schema identified from the type of the document;
   generating a similarity score between the one of the plurality of tokens with a correct value and a reward based upon the similarity score;
   determining that an optimum minimum average similarity rate has not been obtained; and
   training, based upon the determining, the reinforced learning model using a loss function that includes the reward.

18. The computer program product of claim 17, wherein
the comparing and the generating are performed for all of a plurality of SOR fields in the schema; and
the determining is based upon similarity scores for all of the plurality of SOR fields.

19. The computer program product of claim 17, wherein
the reinforced learning model is a Deep Q Network, and
the NLP agent includes a machine learning engine.

20. The computer program product of claim 17, wherein after a determination is made that optimum minimum average similarity rate has been obtained, the training is repeated using another document from the document corpus.

* * * * *